United States Patent
Cohrs et al.

(10) Patent No.: US 10,351,802 B2
(45) Date of Patent: Jul. 16, 2019

(54) LAUNDRY DETERGENTS CONTAINING SOIL RELEASE POLYMERS

(71) Applicant: Clariant International Ltd., Muttenz (CH)

(72) Inventors: Carsten Cohrs, Frankfurt am Main (DE); Dirk Fischer, Hahnheim (DE); Henricus Peerlings, Spabrücken (DE); Kevin Mutch, Frankfurt (DE)

(73) Assignee: Clariant International Ltd., Muttenz (CH)

( * ) Notice: Subject to any disclaimer, the term of this patent is extended or adjusted under 35 U.S.C. 154(b) by 0 days.

(21) Appl. No.: 15/525,456

(22) PCT Filed: Nov. 10, 2015

(86) PCT No.: PCT/EP2015/076274
§ 371 (c)(1),
(2) Date: May 9, 2017

(87) PCT Pub. No.: WO2016/075179
PCT Pub. Date: May 19, 2016

(65) Prior Publication Data
US 2017/0327773 A1 Nov. 16, 2017

(30) Foreign Application Priority Data
Nov. 11, 2014 (EP) ..................................... 14003785

(51) Int. Cl.
| | | |
|---|---|---|
| C11D 1/00 | (2006.01) |
| C11D 3/37 | (2006.01) |
| C11D 3/00 | (2006.01) |
| C08G 63/672 | (2006.01) |
| C08G 63/685 | (2006.01) |

(52) U.S. Cl.
CPC .......... *C11D 3/0036* (2013.01); *C08G 63/672* (2013.01); *C08G 63/6856* (2013.01); *C11D 3/3715* (2013.01)

(58) Field of Classification Search
CPC ............ C11D 1/00; C11D 3/37; C11D 3/3715
See application file for complete search history.

(56) References Cited

U.S. PATENT DOCUMENTS

| | | |
|---|---|---|
| 2,182,306 A | 12/1936 | Heinrich et al. |
| 2,208,095 A | 7/1940 | Essselmann et al. |
| 2,553,696 A | 5/1951 | Wilson |
| 2,806,839 A | 9/1957 | Crowther et al. |
| 3,033,746 A | 5/1962 | Moyle et al. |

(Continued)

FOREIGN PATENT DOCUMENTS

| | | |
|---|---|---|
| DE | 102007013217 | 9/2008 |
| EP | 0199403 | 10/1986 |

(Continued)

OTHER PUBLICATIONS

International Search Report for PCT/EP2015/076274, dated Jan. 22, 2016.
International Preliminary Report on Patentability for PCT/EP2015/076274, dated Jan. 30, 2017.
Machine translation of DE 102007013217, Sep. 18, 2008.
English abstract for EP 1661933, May 31, 2006.
English abstract for WO 2009-065738, May 28, 2009.
"The Jeffamine Polyetheramines", Sep. 4, 2013 (Sep 4, 2013), XP002738911.
Huntsman Corporation: "Technical Bulletin—JEFFAMINE® M-2070 Polyetheramine", 2007, XP002738916.

*Primary Examiner* — Brian P Mruk
(74) *Attorney, Agent, or Firm* — Tod A. Waldrop

(57) ABSTRACT

The invention relates to liquid laundry detergent compositions comprising a) one or more polyesters comprising two or more of the repeating structural unit (a1), one or more of the repeating structural unit (a2) and either one or two of the terminal group (a3), wherein $G^1$ is one or more of $(OC_nH_{2n})$ with n being a number of from 2 to 10, $R^1$ is a $C_{1-30}$ alkyl, p is based on a molar average, a number of from 0 to 60, q is based on a molar average, a number of from 0 to 50, whereby the $(OC_3H_6)$— and $(OC_2H_4)$— groups of the terminal group (a3) may be arranged blockwise, alternating, periodically and/or statistically and wherein the connections of the groups $(OC_3H_6)$— and $(OC_2H_4)$— to $R^1$— and —NH are free to vary, adjacent structural units (a1) are connected by the structural unit (a2), in the case that only one terminal group (a3) is present in the polymer, the other terminal group is selected from the group consisting of OH, $OCH_3$, and $G^1OH$, and both terminal groups may only be linked to the structural unit (a1), and b) one or more surfactants. The one or more polyesters of component a) possess advantageous stability in alkaline environments, beneficial solubility and advantageously are clearly soluble in alkaline compositions such as liquid laundry detergent compositions and also possess advantageous soil release properties on fatty and oily stains.

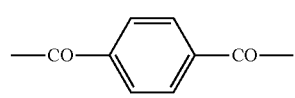

(a1)

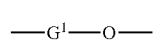

(a2)

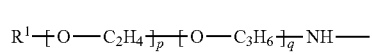

(a3)

12 Claims, No Drawings

(56) References Cited

U.S. PATENT DOCUMENTS

| | | |
|---|---|---|
| 3,893,929 A | 7/1975 | Basadur |
| 3,959,230 A | 5/1976 | Hays |
| 3,962,152 A | 6/1976 | Nicol et al. |
| 4,132,680 A | 1/1979 | Nicol |
| 4,702,857 A * | 10/1987 | Gosselink ............... C08G 63/66 510/299 |
| 4,711,730 A | 12/1987 | Gosselink et al. |
| 4,713,194 A | 12/1987 | Gosselink |
| 4,759,876 A | 7/1988 | Crossin |
| 8,871,703 B2 | 10/2014 | Morschhaeuser et al. |
| 9,365,806 B2 | 6/2016 | Carswell et al. |
| 2009/0036641 A1 | 2/2009 | Lang et al. |
| 2015/0166938 A1 | 6/2015 | Fischer et al. |
| 2015/0203630 A1 | 7/2015 | Fischer et al. |
| 2015/0218491 A1 | 8/2015 | Morschhaeuser et al. |
| 2015/0240029 A1 | 8/2015 | Fischer et al. |
| 2017/0145348 A1 | 5/2017 | Klug et al. |
| 2017/0321154 A1 | 11/2017 | Cohrs et al. |

FOREIGN PATENT DOCUMENTS

| | | | | |
|---|---|---|---|---|
| EP | 1661933 | 5/2006 | | |
| EP | 1966273 | 7/2007 | | |
| GB | 1088984 | 10/1967 | | |
| GB | 1466639 | 3/1977 | | |
| WO | WO 2007079850 | 7/2007 | | |
| WO | WO 2007138054 | 12/2007 | | |
| WO | WO 2009065738 | 5/2009 | | |
| WO | WO 2011063945 | 6/2011 | | |
| WO | WO 2012104156 | 8/2012 | | |
| WO | WO 2014/019903 | * | 2/2014 | ........... C08G 63/183 |
| WO | WO 2014019658 | 2/2014 | | |
| WO | WO 2014019903 | 2/2014 | | |

* cited by examiner

LAUNDRY DETERGENTS CONTAINING SOIL RELEASE POLYMERS

This invention relates to liquid laundry detergent compositions comprising soil release polymers with improved hydrolytic stability. The compositions display good soil release performance compared to compositions containing no soil release polymer.

Polyester containing fabrics can be surface modified to increase the hydrophilicity of the fabric, which can improve soil removal. Such surface modification can be achieved through direct treatment of the fabric, as outlined for example in GB 1,088,984, or more preferably through deposition of a surface modifying polymer in a washing process, as disclosed for example in U.S. Pat. No. 3,962,152. The renewable soil release finish imparted through washing ensures the continuous protection of the fiber from oily stains.

The polymers used in these processes typically consist of a polyester midblock with either one or two endblocks of polyethylene glycol, as further outlined in U.S. Pat. No. 3,959,230 and U.S. Pat. No. 3,893,929.

The inclusion of anionic moieties in the polymer structure is known to improve the efficacy of these soil release polymers and in particular, improve their anti-redeposition properties. For example, DE 10 2007 013 217 and EP 1 966 273 disclose anionic polyesters that may be used as soil release agents in laundry detergents. Such anionic soil release polymers are particularly well suited for use in powder detergents due to handling and compatibility with the detergent composition.

The use of nonionic soil release agents in liquid laundry detergents is well known in the art. GB 1,466,639, U.S. Pat. No. 4,132,680, U.S. Pat. No. 4,702,857, EP 0 199 403, U.S. Pat. No. 4,711,730, U.S. Pat. No. 4,713,194 and U.S. Pat. No. 4,759,876 disclose aqueous detergent compositions containing soil release polymers.

One of the major challenges for the existing soil release polymers described in the prior art, is their susceptibility to hydrolysis under alkaline conditions, as is usually the case in liquid laundry detergent compositions.

Therefore, the problem to be solved by the present invention was to provide liquid laundry detergent compositions possessing good soil release performance with advantageous storage stability.

Surprisingly, it has been found that this problem can be solved through the incorporation of one or more polyesters comprising two or more of the repeating structural unit (a1), one or more of the repeating structural unit (a2) and either one or two of the terminal group (a3)

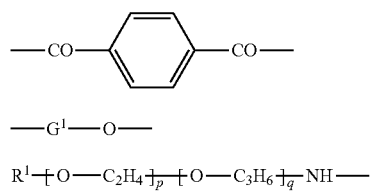

wherein
G$^1$ is one or more of (OC$_n$H$_{2n}$) with n being a number of from 2 to 10, preferably from 2 to 6 and more preferably (OC$_2$H$_4$), (OC$_3$H$_6$), (OC$_4$H$_8$) or (OC$_6$H$_{12}$), R$^1$ is a C$_{1-30}$ alkyl, preferably C$_{1-4}$ alkyl and more preferably methyl, p is based on a molar average, a number of from 0 to 60, preferably from 1 to 50 and more preferably from 2 to 40, q is based on a molar average, a number of from 0 to 50, preferably from 1 to 40 and more preferably from 2 to 30, whereby the (OC$_3$H$_6$)- and (OC$_2$H$_4$)-groups of the terminal group (a3) may be arranged blockwise, alternating, periodically and/or statistically, preferably blockwise and/or statistically, and wherein the connections of the groups (OC$_3$H$_6$)— and (OC$_2$H$_4$)— to R$^1$— and —NH are free to vary, adjacent structural units (a1) are connected by the structural unit (a2), in the case that only one terminal group (a3) is present in the polymer, the other terminal group is selected from the group consisting of OH, OCH$_3$, and G$^1$OH, and both terminal groups may only be linked to the structural unit (a1), into liquid laundry detergent compositions comprising one or more surfactants.

Therefore, the subject matter of the present invention is liquid laundry detergent compositions comprising:

a) one or more polyesters comprising two or more of the repeating structural unit (a1), one or more of the repeating structural unit (a2) and either one or two of the terminal group (a3)

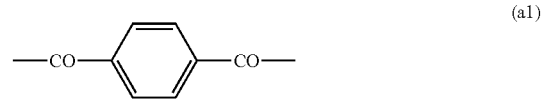
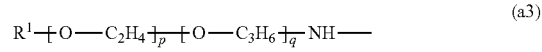

wherein
G$^1$ is one or more of (OC$_n$H$_{2n}$) with n being a number of from 2 to 10, preferably from 2 to 6 and more preferably (OC$_2$H$_4$), (OC$_3$H$_6$), (OC$_4$H$_8$) or (OC$_6$H$_{12}$), R$^1$ is a C$_{1-30}$ alkyl, preferably C$_{1-4}$ alkyl and more preferably methyl, p is based on a molar average, a number of from 0 to 60, preferably from 1 to 50 and more preferably from 2 to 40, q is based on a molar average, a number of from 0 to 50, preferably from 1 to 40 and more preferably from 2 to 30, whereby the (OC$_3$H$_6$)- and (OC$_2$H$_4$)-groups of the terminal group (a3) may be arranged blockwise, alternating, periodically and/or statistically, preferably blockwise and/or statistically, and wherein the connections of the groups (OC$_3$H$_6$)— and (OC$_2$H$_4$)— to R$^1$— and —NH are free to vary, adjacent structural units (a1) are connected by the structural unit (a2), in the case that only one terminal group (a3) is present in the polymer, the other terminal group is selected from the group consisting of OH, OCH$_3$, and G$^1$OH, and both terminal groups may only be linked to the structural unit (a1), and b) one or more surfactants.

The inventive liquid laundry detergent compositions exhibit liquid properties under standard temperature and pressure.

The repeating structural units (a1) are linked indirectly via the repeating structural unit (a2), which results in the following structural entity:

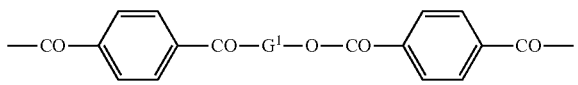

The terminal group (a3) may only be linked to the repeating structural unit (a1), which results in the following structural entity:

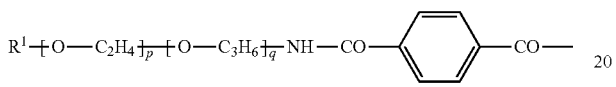

In the case that the inventive liquid laundry detergent composition comprises more than one polyester molecule of component a), the definition of the group $G^1$ of the repeating structural unit (a2) may vary between those polyester molecules. Furthermore, in the case that one polyester molecule of component a) comprises two or more of the repeating structural units (a2), the definition of the group $G^1$ may vary between those repeating structural units (a2).

In the case that the inventive liquid laundry detergent composition comprises more than one polyester molecule of component a), the definition of the group $R^1$ of the terminal group (a3) may vary between those polyester molecules. Furthermore, in the case that one polyester molecule of component a) comprises two of the terminal groups (a3) the definition of $R^1$ may vary between those terminal groups.

The $(OC_3H_6)$- and $(OC_2H_4)$-groups of the terminal group (a3) may be arranged blockwise, alternating, periodically and/or statistically, preferably blockwise and/or statistically. This means that within one instance of the terminal group (a3), the groups $(OC_3H_6)$— and $(OC_2H_4)$— may be arranged, for example, in a purely statistically or blockwise form but may also be arranged in a form which could be considered as both statistical and blockwise, e.g. small blocks of $(OC_3H_6)$— and $(OC_2H_4)$— arranged in a statistical manner, or in a form wherein adjacent instances of statistical and blockwise arrangements of the groups $(OC_3H_6)$— and $(OC_2H_4)$— exist.

The connections of the groups $(OC_3H_6)$— and $(OC_2H_4)$— to $R^1$— and —NH are free to vary. This means for example, that both $R^1$— and —NH may be connected to a $(OC_3H_6)$— group, they may both be connected to a $(OC_2H_4)$— group or they may be connected to different groups selected from $(OC_2H_4)$— and $(OC_3H_6)$—.

WO 2014/019658 and WO 2014/019659 describe soil release polymers with advantageous alkaline stability brought about through the inclusion of a small number of propylene oxide units in the endblock. The use of such polymers in a liquid laundry detergent is described in WO 2014/011903.

One advantage of the inventive liquid laundry detergent compositions is the hydrolytic stability of the one or more soil release polyesters of component a).

The inventive liquid laundry detergent compositions may contain water as the main solvent or alternatively organic solvents or hydrotropes commonly used in liquid laundry detergent compositions, such as monoproylene glycol, glycerol, ethanol and other glycols. Systems containing low amounts of water are particularly suited to single dose formats such as pouches or capsules, whereby high levels of water can damage the water soluble coating of the pouch.

In the one or more polyesters of component a) of the inventive liquid laundry detergent compositions, $R^1$ is preferably $CH_3$.

In the one or more polyesters of component a) of the inventive liquid laundry detergent compositions, the sum of p and q, based on a molar average, is preferably a number of from 1 to 110, more preferably a number of from 5 to 70 and even more preferably a number of from 10 to 60.

In one preferred embodiment of the inventive liquid laundry detergent compositions, the one or more polyesters of component a) additionally comprise one or more of the repeating structural unit (a4)

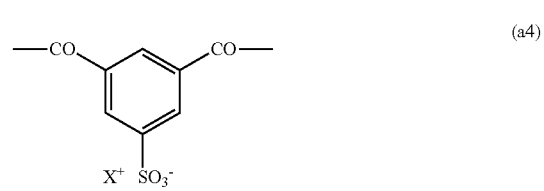

wherein
$X^+$ is a counter-ion, preferably $Na^+$, $K^+$, $Ca^{2+}/2$ or $NH_4^+$, and more preferably $Na^+$.

When present in the polyester, these one or more structural units (a4) may be indirectly linked to repeating structural units (a1) or other repeating structural units (a4) via the repeating structural unit (a2), or directly linked to a terminal group.

Preferably, the average molecular weight ($M_w$) of the one or more polyesters of component a) of the inventive liquid laundry detergent compositions is from 2000 to 20000 g/mol.

The average molecular weight ($M_w$) of the one or more polyesters of component a) of the inventive liquid laundry detergent compositions may be determined by GPC analysis, preferably as detailed in the following: 10 µl of sample is injected onto a PSS Suprema column of dimensions 300×8 mm with porosity 30 Å and particle size 10 µm. The detection is monitored at 235 nm on a multiple wavelength detector. The employed eluent is 1.25 g/l of disodium hydrogen phosphate in a 45/55% (v/v) water/acetonitrile mixture. Separations are conducted at a flow-rate of 0.8 ml/min. Quantification is performed by externally calibrating standard samples of different molecular weight polyethylene glycols.

In the one or more polyesters of component a) of the inventive liquid laundry detergent compositions, the average number of repeating structural unit (a1) is preferably from 2 to 60, more preferably from 2 to 50, even more preferably from 3 to 40 and extraordinarily preferably from 4 to 30.

In the one or more polyesters of component a) of the inventive liquid laundry detergent compositions, the total amount of repeating structural units (a1) and (a2) and of the terminal group (a3), based on the total weight of the one or more polyesters of component a), is preferably at least 50 wt.-%, more preferably at least 70 wt.-%, even more preferably at least 80 wt.-%, extraordinarily preferably at least 90 wt.-% and especially preferably at least 95 wt.-%.

In the one or more polyesters of component a) of the inventive liquid laundry detergent compositions, the amount of repeating structural unit (a4), based on the total weight of the one or more polyesters of component a) of the liquid laundry detergent composition, is preferably at least 0.1 wt.-%, more preferably from 0.1 wt.-% to 25 wt.-%, and even more preferably from 0.5 wt.-% to 20 wt.-%.

In the one or more polyesters of component a) of the inventive liquid laundry detergent compositions, the repeating structural units are preferably exclusively selected from the group consisting of repeating structural units (a1) and (a2). In a further preferred embodiment of the inventive liquid laundry detergent compositions, the one or more polyesters of component a), described in the following and further referred to as "Polyester A", comprise structural units exclusively selected from the group consisting of the repeating structural units (a1) and (a2) and the terminal group (a3), whereby two or more of the repeating structural unit (a1), one or more of the repeating structural unit (a2) and either one or two of the terminal group (a3) must be present

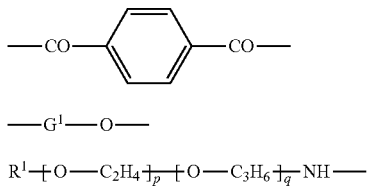

(a1)

(a2)

(a3)

wherein
$G^1$ is $(OC_3H_6)$,
$R^1$ is $CH_3$,
p is based on a molar average, a number of from 0 to 15, preferably from 2 to 15, and more preferably from 5 to 14,
q is based on a molar average, a number of from 12 to 120, preferably from 20 to 50, more preferably from 25 to 40, and even more preferably from 30 to 40.

In the one or more Polyesters A, adjacent structural units (a1) are connected by the structural unit (a2). Furthermore, in the case that only one terminal group (a3) is present in the polymer, the other terminal group is selected from the group consisting of OH, $OCH_3$, and $G^1OH$. Both terminal groups may only be linked to the structural unit (a1). Furthermore, the $(OC_3H_6)$- and $(OC_2H_4)$-groups of the terminal group (a3) are arranged blockwise and/or statistically and the connections of the groups $(OC_3H_6)$— and $(OC_2H_4)$— to $R^1$— and —NH are free to vary.

In the one or more Polyesters A, the average number of repeating structural unit (a1) is preferably from 2 to 30, more preferably from 2 to 20, and even more preferably from 2 to 10.

In the one or more Polyesters A, the total amount of repeating structural units (a1) and (a2) and terminal group (a3), based on the total weight of the one or more Polyesters A in the liquid laundry detergent composition, is preferably at least 50 wt.-%, more preferably at least 70 wt.-%, even more preferably at least 80 wt.-%, extraordinarily preferably at least 90 wt.-% and especially preferably at least 95 wt.-%.

The average molecular weight ($M_w$) of the one or more Polyesters A is preferably from 2000 to 20000 g/mol.

The one or more polyesters of component a) contained in the inventive liquid laundry detergent compositions, have an advantageous stability in alkaline environment, possess beneficial solubility and advantageously are clearly soluble in alkaline compositions such as liquid laundry detergent compositions and also possess advantageous soil release properties on fatty and oily stains.

The groups $—OC_2H_4$ in the structural units "$R^1$—$(OC_2H_4)_p$—$(OC_3H_6)_q$—NH—" and in the structural units $G^1$ are of the formula $—O—CH_2—CH_2—$.

The groups $—OC_3H_6$ in the structural units "$R^1$—$(OC_2H_4)_p$—$(OC_3H_6)_q$—NH—" and in the structural units $G^1$ are of the formula $—O—CH(CH_3)—CH_2—$ or $—O—CH_2—CH(CH_3)—$, i.e. of the formula

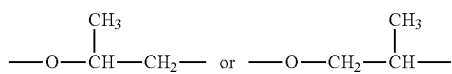

The groups $(OC_4H_8)$ in the structural units $G^1$ are preferably of the formula $—O—CH(CH_3)—CH(CH_3)—$, i.e. of the formula

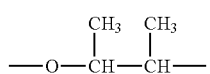

The groups $(OC_6H_{12})$ in the structural units $G^1$ are preferably of the formula $—O—CH_2—CH(n-C_4H_9)—$ or $—O—CH(n-C_4H_9)—CH_2—$, i.e. of the formula

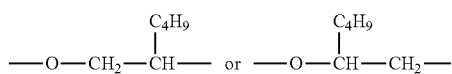

A subject matter of the present invention is liquid laundry detergent compositions comprising
a) one or more polyesters obtainable through a polymerization reaction of the following monomers:
  I) dimethyl terephthalate, and
  II) one or more alkylene glycols of the formula $HOC_nH_{2n}OH$, with n being a number of from 2 to 10, preferably from 2 to 6 and more preferably $(HOC_2H_4OH)$, $(HOC_3H_6OH)$, $(HOC_4H_8OH)$ or $(HOC_6H_{12}OH)$, and
  III) one or more alkyl capped polyalkylene glycols of the formula

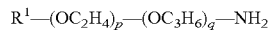

wherein
  $R^1$ is a $C_{1-30}$ alkyl, preferably a $C_{1-4}$ alkyl and more preferably methyl, the $(OC_3H_6)$- and $(OC_2H_4)$-groups may be arranged blockwise, alternating, periodically and/or statistically, preferably blockwise and/or statistically, and wherein the connections of the groups $(OC_3H_6)$— and $(OC_2H_4)$— to $R^1$— and —$NH_2$ are free to vary,
  p is based on a molar average a number of from 0 to 60, preferably from 1 to 50 and more preferably from 2 to 40,
  q is based on a molar average a number of from 0 to 50, preferably from 1 to 40 and more preferably from 2 to 30, and
  IV) optionally one or more further monomers, that are different from the monomers I) to III), preferably selected from the group consisting of aromatic dicarboxylic acids, their derivatives and the salts thereof, more preferably phthalic acid, isophthalic acid, 3-sulfophthalic acid, 4-sulfophthalic acid, 5-sulfoisophthalic acid and their salts, and even more preferably 5-sulfoisophthalic acid and its salts, and b) one or more surfactants.

The polyesters of component a) obtainable through a polymerization reaction of the monomers I), II), Ill), and optionally IV) are referred to in the following as "Polyesters B".

$R^1$ in the definition of monomer III) is preferably $CH_3$.

The sum of p and q in monomer III), based on a molar average, is preferably a number of from 1 to 110, more preferably a number of from 5 to 70 and even more preferably a number of from 10 to 60.

The one or more optional monomers IV) are preferably selected from the group consisting of 5-sulfoisophthalic acid and its salts. Preferably the salts are selected from the group consisting of sodium, potassium, calcium and ammonium salts and more preferably the salt is the sodium salt.

Preferably, the average molecular weight ($M_w$) of the Polyesters B contained in the inventive liquid laundry detergent compositions is from 2000 to 20000 g/mol.

In the one or more Polyesters B contained in the inventive liquid laundry detergent compositions, the average number of repeating structural units resulting from monomer I) in the polymerization is preferably from 2 to 60, more preferably from 2 to 50, even more preferably from 3 to 40 and extraordinarily preferably from 4 to 30.

Preferably, the amount of repeating structural units in the one or more Polyesters B resulting from monomers I) and II) in the polymerization plus the amount of terminal groups in the one or more Polyesters B resulting from monomer III) in the polymerization, based on the total weight of the one or more Polyesters B, is at least 50 wt.-%, more preferably at least 70 wt.-%, even more preferably at least 80 wt.-%, extraordinarily preferably at least 90 wt.-% and especially preferably at least 95 wt.-%.

In the one or more Polyesters B, the amount of polymer resulting from the one or more optional monomers IV) in the polymerization, based on the total weight of the one or more Polyesters B, is preferably at least 0.1 wt.-%, more preferably from 0.1 wt.-% to 25 wt.-% and even more preferably from 0.5 wt.-% to 20 wt.-%.

Preferably, the one or more Polyesters B contained in the inventive liquid laundry detergent compositions are obtainable through polymerizing exclusively the monomers I), II) and III).

In one preferred embodiment of the invention, the one or more Polyesters B contained in the inventive liquid laundry detergent compositions, are obtainable by first synthesizing a precursor through reaction of monomers I) and III) before further reacting with monomer II) and optionally monomer IV).

In another preferred embodiment of the invention, the one or more Polyesters B contained in the inventive liquid laundry detergent compositions, are obtainable by first synthesizing a precursor through reaction of monomers I), Ill) and optionally IV) before further reacting with monomer II).

In a further preferred embodiment of the inventive liquid laundry detergent compositions, the one or more polyesters of component a), described in the following and further referred to as "Polyester $A^a$", are obtainable through a polymerization reaction of the following monomers:

I) dimethyl terephthalate, and
II) ($HOC_3H_6OH$), and
III) one or more alkyl capped polyalkylene glycols of the formula

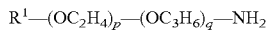

wherein
$R^1$ is a $C_{1-30}$ alkyl, preferably a $C_{1-4}$ alkyl and more preferably methyl, the ($OC_3H_6$)- and ($OC_2H_4$)-groups may be arranged blockwise, alternating, periodically and/or statistically, preferably blockwise and/or statistically, and wherein the connections of the groups ($OC_3H_6$)— and ($OC_2H_4$)— to $R^1$— and —$NH_2$ are free to vary, p is based on a molar average a number of from 0 to 60, preferably from 1 to 50 and more preferably from 2 to 40, q is based on a molar average a number of from 0 to 50, preferably from 1 to 40 and more preferably from 2 to 30.

In the one or more Polyesters $A^a$, the average number of repeating structural units resulting from monomer I) in the polymerization is preferably from 2 to 30, more preferably from 2 to 20, and even more preferably from 2 to 10.

Preferably, the amount of repeating structural units in the one or more Polyesters $A^a$ resulting from monomers I) and II) in the polymerization plus the amount of terminal groups in the one or more Polyesters $A^a$ resulting from monomer III) in the polymerization, based on the total weight of the one or more Polyesters $A^a$, is at least 50 wt.-%, more preferably at least 70 wt.-%, even more preferably at least 80 wt.-%, extraordinarily preferably at least 90 wt.-% and especially preferably at least 95 wt.-%.

The average molecular weight ($M_w$) of the one or more of Polyesters $A^a$ is preferably from 2000 to 20000 g/mol.

The one or more polyesters of component a) are present in the inventive liquid laundry detergent compositions in an amount of preferably at least 0.1 wt.-%, more preferably from 0.1 wt.-% to 10 wt.-%, even more preferably from 0.2 wt.-% to 5 wt.-% and extraordinarily preferably from 0.25 wt.-% to 3 wt.-%, in each case based on the total weight of the liquid laundry detergent composition.

Surfactants

The inventive liquid laundry detergent compositions comprise one or more surfactants, component b).

Surfactants assist in removing soil from textile materials and also assist in maintaining removed soil in solution or suspension in the wash liquor.

Preferably, the one or more surfactants of component b) of the liquid laundry detergent compositions are selected from the group consisting of anionic, nonionic, cationic and zwitterionic surfactants, and more preferably from the group consisting of anionic, nonionic and zwitterionic surfactants.

Anionic Surfactants

Preferred anionic surfactants are alkyl sulfonates and alkyl ether sulfates.

Preferred alkyl sulfonates are alkylbenzene sulfonates, particularly linear alkylbenzene sulfonates (LAS) having an alkyl chain length of $C_8$-$C_{15}$. Possible counter ions for concentrated alkaline liquids are ammonium ions, e.g. those generated by the neutralization of alkylbenzene sulfonic acid with one or more ethanolamines, for example monoethanolamine (MEA) and triethanolamine (TEA), or alternatively, alkali metals, e.g. those arising from the neutralization of alkylbenzene sulfonic acid with alkali hydroxides. The linear alkyl benzene sulfonate surfactants may be LAS with an alkyl chain length of preferably from 8 to 15 and more preferably from 12 to 14. The neutralization of the acid may be performed before addition to the liquid laundry detergent compositions or in the formulation process through excess addition of neutralizing agent.

Preferred alkyl ether sulfates (AES) are alkyl polyethoxylate sulfate anionic surfactants of the formula $$R^2O(C_2H_4O)_ySO_3^-M^+$$

wherein
$R^2$ is a saturated or unsaturated alkyl chain having preferably from 10 to 22 carbon atoms, and more preferably from 12 to 16 carbon atoms,
$M^+$ is a cation which makes the compound water-soluble, preferably an ammonium cation, a substituted ammonium cation, an alkali metal cation, or other material chosen from the list of buffers,
y averages preferably from 1 to 15, more preferably from 1 to 3 and even more preferably is 3.

Nonionic Surfactants

Nonionic surfactants include primary and secondary alcohol ethoxylates, especially $C_8$-$C_{20}$ aliphatic alcohol ethoxylated with an average of from 1 to 20 moles of ethylene oxide per mole of alcohol, and more especially the $C_{10}$-$C_{15}$ primary and secondary aliphatic alcohols ethoxylated with an average of from 1 to 10 moles of ethylene oxide per mole of alcohol. Non-ethoxylated nonionic surfactants include alkyl polyglycosides, glycerol monoethers and polyhydroxy amides (glucamide). Mixtures of nonionic surfactant may be used.

When included therein, the liquid laundry detergent composition contains preferably from 0.2 wt.-% to 40 wt.-% and more preferably 1 wt.-% to 20 wt.-% of a nonionic surfactant, such as alcohol ethoxylate, nonylphenol ethoxylate, alkylpolyglycoside, alkyldimethylamineoxide, ethoxylated fatty acid monoethanolamide, fatty acid monoethanolamide, polyhydroxy alkyl fatty acid amide, or N-acyl N-alkyl derivatives of glucosamine ("glucamides").

Nonionic surfactants that may be used include the primary and secondary alcohol ethoxylates, especially the $C_8$-$C_{20}$ aliphatic alcohols ethoxylated with an average of from 1 to 35 moles of ethylene oxide per mole of alcohol, and more especially the $C_{10}$-$C_{15}$ primary and secondary aliphatic alcohols ethoxylated with an average of from 1 to 10 moles of ethylene oxide per mole of alcohol.

Zwitterionic Surfactants

The liquid laundry detergent composition may comprise up to 10 wt.-% of a zwitterionic surfactant, e.g. amine oxide or betaine.

Typical amine oxides used are of the formula $$R^3N(O)(CH_2R^4)_2$$

wherein
$R^3$ is a long chain moiety and each $CH_2R^4$ are short chain moieties,
$R^4$ is preferably selected from the group consisting of H, $CH_3$ and —$CH_2OH$.

In general $R^3$ is a primary or branched hydrocarbyl moiety with a chain length of from 8 to 18, which can be saturated or unsaturated. Preferably, $R^3$ is a primary alkyl moiety.

Preferred amine oxides have compositions wherein $R^3$ is a $C_8$-$C_{18}$ alkyl and $R^4$ is H. These amine oxides are illustrated by $C_{12-14}$ alkyldimethyl amine oxide, hexadecyl dimethylamine oxide, octadecylamine oxide.

A preferred amine oxide material is Lauryl dimethylamine oxide, also known as dodecyldimethylamine oxide or DDAO. Such an amine oxide material is commercially available from The Global Amines Company Pte. Ltd. under the trade name Genaminox® LA.

Betaines may be alkyldimethyl betaines or alkylamido betaines, wherein the alkyl groups have $C_{12-18}$ chains.

In one preferred embodiment of the invention, the one or more surfactants of component b) of the liquid laundry detergent compositions are selected from the group consisting of anionic and nonionic surfactants.

In another preferred embodiment of the invention, the one or more surfactants of component b) of the liquid laundry detergent compositions are selected from the group consisting of linear alkyl benzene sulfonates, alkyl ether sulfates, nonionic surfactants, amine oxides and betaines, and preferably the one or more surfactants of component b) of the liquid laundry detergent compositions are selected from the group consisting of linear alkyl benzene sulfonates, alkyl ether sulfates and nonionic surfactants.

Additional Surfactants

Other surfactants than the preferred LAS, AES, and nonionic surfactants may be added to the mixture of detersive surfactants.

Although less preferred, some alkyl sulfate surfactant may be used, especially the non-ethoxylated $C_{12-15}$ primary and secondary alkyl sulfates. Soap may also be used. Levels of soap are preferably lower than 10 wt.-%.

Preferably, the one or more surfactants of component b) of the inventive liquid laundry detergent compositions, are present in an amount of at least 5 wt.-%, more preferably from 5 wt.-% to 65 wt.-%, even more preferably from 6 to 60 wt.-% and extraordinarily preferably from 7 wt.-% to 55 wt.-%, in each case based on the total weight of the liquid laundry detergent composition.

Further Optional Ingredients

In addition to the essential ingredients as claimed, the liquid laundry detergent compositions may comprise one or more optional ingredients, e.g. they may comprise conventional ingredients commonly used in detergent compositions, especially laundry detergent compositions. Examples of optional ingredients include, but are not limited to builders, bleaching agents, bleach active compounds, bleach activators, bleach catalysts, photobleaches, dye transfer inhibitors, colour protection agents, anti-redeposition agents, dispersing agents, fabric softening and antistatic agents, fluorescent whitening agents, enzymes, enzyme stabilizing agents, foam regulators, defoamers, malodour reducers, preservatives, disinfecting agents, hydrotropes, fibre lubricants, anti-shrinkage agents, buffers, fragrances, processing aids, colorants, dyes, pigments, anti-corrosion agents, fillers, stabilizers and other conventional ingredients for washing or laundry detergent compositions.

Polyalkoxylated Polyethyleneimine

For detergency boosting, it is advantageous to use a second polymer alongside the soil release polymers in the liquid laundry detergent compositions of the present invention. This second polymer is preferably a polyalkoxylated polyethyleneimine (EPEI). Polyethylene imines are materials composed of ethylene imine units —$CH_2CH_2NH$— and, where branched, the hydrogen on the nitrogen is replaced by another chain of ethylene imine units. These polyethyleneimines can be prepared, for example, by polymerizing ethyleneimine in the presence of a catalyst such as carbon dioxide, sodium bisulfite, sulfuric acid, hydrogen peroxide, hydrochloric acid, acetic acid, and the like. Specific methods for preparing these polyamine backbones are disclosed in U.S. Pat. No. 2,182,306, U.S. Pat. No. 3,033,746, U.S. Pat. No. 2,208,095, U.S. Pat. No. 2,806,839, and U.S. Pat. No. 2,553,696.

Other Polymers

In addition to the polyester soil release polymer and the optional EPEI, the liquid laundry detergent compositions may comprise other polymeric materials, for example: dye transfer inhibition polymers, anti redeposition polymers and cotton soil release polymers, especially those based on modified cellulosic materials. Especially, when EPEI is not present, the liquid laundry detergent composition may further comprise a polymer of polyethylene glycol and vinyl acetate, for example the lightly grafted copolymers described in WO 2007/138054. Such amphiphilic graft polymers based on water soluble polyalkylene oxides as graft base and side chains formed by polymerisation of a vinyl ester component have the ability to enable reduction of surfactant levels whilst maintaining high levels of oily soil removal.

Hydrotropes

In the context of this invention a hydrotrope is a solvent that is neither water nor conventional surfactant that aids the solubilisation of the surfactants and other components, especially polymer and sequestrant, in the liquid to render it isotropic. Among suitable hydrotropes there may be mentioned as preferred: monopropylene glycol (MPG), glycerol, sodium cumene sulfonate, ethanol, other glycols, e.g. dipropylene glycol, diethers and urea. MPG and glycerol are preferred hydrotropes.

Enzymes

It is preferable that at least one or more enzymes selected from protease, mannanase, pectate lyase, cutinase, esterase, lipase, amylase, and cellulase may be present in the liquid laundry detergent compositions. Less preferred additional enzymes may be selected from peroxidase and oxidase. The enzymes are preferably present with corresponding enzyme stabilizers. The total enzyme content is preferably from 0 wt.-% to 5 wt.-%, more preferably from 0.5 wt.-% to 5 wt.-% and even more preferably from 1 wt.-% to 4 wt.-%.

Sequestrants

Sequestrants are preferably included. Preferred sequestrants include organic phosphonates, alkanehydroxy phosphonates and carboxylates available under the DEQUEST trade mark from Thermphos. The preferred sequestrant level is less than 10 wt.-% and preferably less than 5 wt.-% of the liquid laundry detergent composition. A particularly preferred sequestrant is HEDP (1-Hydroxyethylidene-1, 1,-diphosphonic acid), for example sold as Dequest 2010. Also suitable but less preferred as it gives inferior cleaning results is Dequest® 2066 (diethylenetriamine penta(methylene phosphonic acid) or Heptasodium DTPMP).

Buffers

In addition to agents optionally included for the generation of anionic surfactants, e.g. from LAS or fatty acids, the presence of buffer is preferred for pH control. Possible buffers are one or more ethanolamines, e.g. monoethanolamine (MEA) or triethanolamine (TEA). They are preferably used in the liquid laundry detergent composition at levels of from 1 to 15 wt.-%. Other suitable amino alcohol buffer materials may be selected from the group consisting of compounds having a molecular weight above 61 g/mol, which includes MEA. Suitable materials also include, in addition to the already mentioned materials: monoisopropanolamine, diisopropanolamine, triisopropanolamine, monoamino hexanol, 2-[(2-methoxyethyl) methylamino]-ethanol, propanolamine, N-methylethanolamine, diethanolamine, monobutanolamine, isobutanolamine, monopentanolamine, 1-amino-3-(2-methoxyethoxy)-2-propanol, 2-methyl-4-(methylamino)-2-butanol and mixtures thereof.

Potential alternatives to amino ethanol buffers are alkali hydroxides such as sodium hydroxide or potassium hydroxide.

It may be advantageous to include fluorescer and/or bleach catalyst in the liquid laundry detergent compositions as further high efficiency performance additives. Perfume and colorants will also desirably be included. The liquid laundry detergent compositions may additionally contain viscosity modifiers, foam boosting agents, preservatives (e.g. bactericides), pH buffering agents, polyelectrolytes, anti-shrinking agents, anti-wrinkle agents, anti-oxidants, sunscreens, anti-corrosion agents, drape imparting agents, anti-static agents and ironing aids. The liquid laundry detergent compositions may further comprise pearlisers and/or opacifiers or other visual cues and shading dye.

Packaging and Dosing

The liquid laundry detergent compositions may be packaged as unit doses in a polymeric film soluble in the wash water. Alternatively the liquids may be supplied in multidose plastics packs with a top or bottom closure. A dosing measure may be supplied with the pack either as a part of the cap or as an integrated system.

Further preferred embodiments of the invention may arise from the combination of above described preferred embodiments.

The invention will now be further described with reference to the following non-limiting examples.

EXAMPLES

The examples below are intended to illustrate the invention in detail without, however, limiting it thereto. Unless explicitly stated otherwise, all percentages given and relating to material amounts are percentages by weight (% by wt. or wt.-%).

Polymer Preparation

The polyesters of component a) of the inventive liquid laundry detergent compositions are prepared by methods well known to the person skilled in the art. A general description is given in the following.

A mixture of sodium acetate (NaOAc) and titanium isopropoxide (TIP) is preferably used as the catalyst system in the preparation.

The following abbreviations and materials are used:
Endcap 1 amine-terminated methyl-ethoxylated-propoxylated polyether with an average molecular weight of 2000 g/mol, an average molar ratio of EO to PO of 4 to 1 and the EO and PO units distributed statistically
DMT Dimethylterephthalate
PG 1,2-propylene glycol
TIP titanium isopropoxide
NaOAc sodium acetate
a.m. active matter General Procedure for the Preparation of the Polyesters The polyester synthesis is carried out in a three-step procedure by the reaction of dimethyl terephthalate (DMT), one or more alkylene glycols, preferably 1,2-propylene glycol (PG), alkyl capped polyalkylene glycol and optionally additional monomers IV), using sodium acetate (NaOAc) and titanium isopropoxide (TIP) as the catalyst system.

Precursor Synthesis

The DMT and alkyl capped polyalkylene glycol are weighed into a five neck round-bottom flask with a quantity of methanol and the contents heated while stirring to reflux. Sodium methoxide is then slowly added and the contents of the flask stirred for 15 hours under reflux conditions. The reaction mixture is then neutralized with a suitable acid, e.g. HCl or $H_2SO_4$ and the solvent evaporated.

Transesterification

The alkylene glycol and a catalytic amount of NaOAc are then added to the flask and the mixture carefully heated in 1 hour to 170° C. for melting and homogenization purposes. At a temperature of about 80° C. the TIP (e.g. 0.2 g) is added. Within 1 hour the temperature is raised to 210° C. When the temperature inside the reaction vessel has reached 180° C., the reaction mixture is purged by a nitrogen stream (5 l/h). During the transesterification, methanol is formed and released from the reaction mixture and is distilled out from the system (distillation temperature<55° C.). After stirring the mixture for 2 hours at 210° C., the nitrogen stream is switched off and the pressure is reduced to 600 mbar within 1.5 hours. The pressure is then reduced to 500 mbar within 1.5 hours.

Polycondensation

The mixture is heated to 230° C. At this temperature the pressure is again set to 500 mbar over a time span of 20 minutes, to 200 mbar within 50 minutes and to 20 mbar within 80 minutes. After that, the pressure is reduced within 10 minutes to 1 mbar. The mixture is stirred for 4 hours at 230° C. at 1 mbar. The reaction mixture is cooled down to 160° C. Vacuum is broken with nitrogen and the molten polymer is stored in a glass jar.

Example I

| Amount | Raw Material [Abbreviation] |
|---|---|
| 101.95 g | DMT |
| 336 g | Endcap 1 |
| 270 ml | Methanol |
| 80 g | PG |
| 0.5 g | NaOAc |
| 0.2 g | TIP |

Liquid laundry detergent compositions containing exemplary polyester A series of exemplary liquid laundry detergent compositions, both excluding and including soil release polymer, were prepared according to Table A. Samples 1 to 3 include sodium hydroxide as the buffering system. Samples 4 to 6 contain triethanolamine as the buffering system. Those compositions containing soil release polymer were subjected to storage tests in order to determine the hydrolytic stability of the polymers.

Key to ingredients used in the compositions of Table A
LAS is $C_{12-14}$ linear alkylbenzene sulfonate, sodium salt
SLES 2EO is sodium lauryl ether sulfate with 2 moles EO (Genapol® LRO, Clariant).
NI 7EO is $C_{12-15}$ alcohol ethoxylate 7EO nonionic (Genapol® LA070, Clariant)
Fatty Acid is a $C_{12-18}$ stripped palm kernel fatty acid
TEA triethanolamine
SRP1 is a polyester prepared according to Example I
TexCare® SRN170 is a comparative soil release polymer comprising —OOC-(1,4-phenylene)-COO— structural units and —O—$CH_2CH_2$—O-structural units, i.e. comprising repeating structural units (a1) and (a2) of the polyesters of component a) contained in the inventive liquid laundry detergent compositions, and no terminal groups (a3) of the polyesters of component a) contained in the inventive liquid laundry detergent compositions

TABLE A

Liquid laundry detergent compositions for hydrolytic stability testing

| | wt.-% a.m. | | | | | |
|---|---|---|---|---|---|---|
| Ingredient | 1 | 2 | 3 | 4 | 5 | 6 |
| LAS | 5.20 | 5.20 | 5.20 | 5.20 | 5.20 | 5.20 |
| SLES 2EO | 6.50 | 6.50 | 6.50 | 6.50 | 6.50 | 6.50 |
| NI 7EO | 5.20 | 5.20 | 5.20 | 5.20 | 5.20 | 5.20 |
| Fatty Acid | 2.80 | 2.80 | 2.80 | 2.80 | 2.80 | 2.80 |
| Glycerol | 2.40 | 2.40 | 2.40 | 2.40 | 2.40 | 2.40 |
| Ethanol | 1.20 | 1.20 | 1.20 | 1.20 | 1.20 | 1.20 |
| Sodium citrate | 1.70 | 1.70 | 1.70 | 1.70 | 1.70 | 1.70 |
| Sodium tetraborate decahydrate | 2.00 | 2.00 | 2.00 | 2.00 | 2.00 | 2.00 |
| TexCare ® SRN170 | 0.00 | 1.00 | 0.00 | 0.00 | 1.00 | 0.00 |
| SRP1 | 0.00 | 0.00 | 1.00 | 0.00 | 0.00 | 1.00 |
| Demin water and NaOH to adjust pH | ad 100 | ad 100 | ad 100 | — | — | — |
| Demin water and TEA to adjust pH | — | — | — | ad 100 | ad 100 | ad 100 |
| pH Value | 8.4 | 8.4 | 8.4 | 8.4 | 8.4 | 8.4 |
| Appearance at room temperature | clear | clear | clear | clear | clear | clear |

Soil Release Test

The inventive liquid laundry detergent compositions containing the polyesters of component a) and prepared according to the compositions listed in Table A, were tested for their soil release performance according to the "Dirty-Motor Oil" Test (DMO-Test) using a Lini Apparatus. The conditions for the test are listed in Table B.

TABLE B

Washing conditions - Soil Release Test

| Equipment | Linitest Plus (SDL Atlas) |
|---|---|
| Water hardness | 14° dH |
| Washing temperature | 40° C. |
| Washing time | 30 min |
| Detergent concentration | 4.3 g/l |
| Soiled Fabric:Liquor Ratio | 1:40 |

As test fabric, white polyester standard swatches (WFK 30A, from WFK Testgewebe GmbH) were used. The fabrics were prewashed three times with the stored liquid laundry detergent compositions. The swatches were then rinsed, dried and soiled with 25 μl of dirty motor oil. After 1 hour the soiled fabrics were washed again with the same stored liquid laundry detergent compositions used in the prewashing step. After rinsing and drying the washed swatches, a measurement of the remission of the stained fabric at 457 nm was made using a spectrophotometer (Datacolor 650).

Based on the remission of the clean unstained swatch, $R_c$, the stained swatches before washing, $R_u$, and the washed swatch, $R_w$, a soil release index (SRI) can be defined:

$$SRI = \frac{(R_w - R_u)}{(R_c - R_u)} \times 100$$

As the soil removal will also depend on the performance of the detergent without polymer, a normalized value, $SRI_{norm}$, can be measured by dividing the value for SRI with polymer by the SRI value without polymer. The resulting quantity no longer depends on $R_c$ and hence simplifies the measurement and calculation. The case of no improvement over the base detergent will deliver a value of 1, hence subtracting 1 will reset the baseline to 0, thus:

$$SRI_{norm} = \frac{(R_w - R_u)_{with\ polymer}}{(R_w - R_u)_{without\ polymer}} - 1$$

The washing results obtained for the stored liquid laundry detergent compositions comprising the soil release polymers are shown in Table C. The values are normalized to the value obtained from a freshly prepared sample of TexCare® SRN170.

Hydrolysis Determination

One of the main products from the hydrolysis of soil release polyesters under alkaline conditions is terephthalic acid. The hydrolytic stability was thus monitored by measuring the terephthalic acid content by HPLC.

HPLC analysis: 10 μl sample was injected onto a Synergi Polar RP column of dimensions 250×4.6 mm with porosity 80 Å and particle size 4 μm. The detection was monitored at 240 nm on a diode array detector. The gradient was made with two eluents. The eluent A was 0.005 mol/l of tetrabutylammonium bisulfate in a 95/5% (v/v) water/acetonitrile mixture. The eluent B was a 5/95% (v/v) water/acetonitrile mixture. Separations were conducted at a flow-rate of 1 ml/min. Quantification was performed by externally calibrating solutions of terephthalic acid in the range 1 to 30 mg/kg.

The samples were independently fully hydrolysed in order to determine the maximum concentration of free terephthalic acid achievable. This was performed by adding 300 mg of the polymer to a vial with 3 g KOH solution (2 mol/dm³) and 15 g water and then heating the solution to 130° C. where it was maintained for 1.5 hours. After cooling, the solution was diluted to 1 wt.-% and the terephthalic acid content measured as described, via HPLC. The concentrations (measured in mg/kg) were then converted into a percentage of the maximum possible terephthalic acid concentration. The values for the degree of hydrolysis thus calculated are shown in Table C.

The prepared compositions were stored at 40° C. for 28 days. The hydrolysis of the polyesters was then determined by measuring the concentration of terephthalic acid by HPLC analysis. The values reported in Table C are also shown relative to the value obtained for aged samples of TexCare® SRN170, namely samples 2 and 5 in Table A.

TABLE C

Stability of compositions prepared according to Table A

| Detergent composition from Table B | Degree of hydrolysis after 28 days at 40° C. [%] | Relative degree of hydrolysis after 28 days at 40° C. [%] | $SRI_{norm}$ / $SRI_{norm}$ (TexCare SRN170 fresh) [%] |
|---|---|---|---|
| 1 (comparative) | — | — | 0 |
| 2 (comparative) | 49 | 100 | 25 |
| 3 (inventive) | 10 | 20 | 93 |
| 4 (comparative) | — | — | 0 |
| 5 (comparative) | 67 | 100 | 7 |
| 6 (inventive) | 18 | 27 | 60 |

The invention claimed is:

1. A liquid laundry detergent composition comprising
a) 0.1 wt.-% to 10 wt.-%, based on the total weight of the liquid laundry detergent composition, of at least one polyester having an average molecular weight ($M_w$) from 2,000 to 20,000 g/mol and comprising at least two of the repeating structural unit (a1), at least one of the repeating structural unit (a2) and either one or two of the terminal group (a3)

(a1)

(a2)

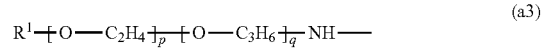

(a3)

wherein
$G^1$ is at least one of $(OC_2H_4)$, $(OC_3H_6)$— or $(OC_4H_8)$,
$R^1$ is a $C_{1-4}$ alkyl,
p is based on a molar average, a number of from 0 to 60,
q is based on a molar average, a number of from 0 to 30,
whereby
the $(OC_3H_6)$- and $(OC_2H_4)$-groups of the terminal group (a3) may be arranged blockwise, alternating, periodically and/or statistically, and wherein the connections of the groups $(OC_3H_6)$— and $(OC_2H_4)$— to $R^1$— and —NH are free to vary,
adjacent structural units (a1) are connected by the structural unit (a2),
in the case that only one terminal group (a3) is present in the polymer, the other terminal group is selected from the group consisting of OH, $OCH_3$, and $G^1OH$, and
both terminal groups may only be linked to the structural unit (a1),
wherein the total amount of repeating structural units (a1) and (a2) and of the terminal group (a3) in the one or more polyesters of component a), based on the total weight of the one or more polyesters of component a), is at least 50 wt.-%, and
b) 5 wt.-% to 65 wt.-%, based on the total weight of the liquid laundry detergent composition, of one or more surfactants.

2. The liquid laundry detergent composition according to claim 1, wherein $R^1$ is $CH_3$.

3. The liquid laundry detergent composition according to claim 1, wherein the sum of p and q, based on a molar average, is a number of from 1 to 110.

4. The liquid laundry detergent composition according to claim 1, wherein the at least one polyester of component a) additionally comprise one or more of the repeating structural unit (a4), which may be indirectly linked to repeating structural units (a1) or other repeating structural units (a4) via the repeating structural unit (a2), or directly linked to a terminal group:

(a4)

wherein

X⁺ is a counter-ion.

5. The liquid laundry detergent composition according to claim 1, wherein the average number of repeating structural unit (a1) in the one or more polyesters of component a) is from 2 to 60.

6. The liquid laundry detergent composition according to claim 1, wherein the total amount of repeating structural units (a1) and (a2) and of the terminal group (a3) in the at least one polyester of component a), based on the total weight of the at least one polyester of component a), is at least 70 wt.-%.

7. The liquid laundry detergent composition according to claim 4, wherein the amount of repeating structural unit (a4) in the at least one polyester of component a), based on the total weight of the at least one polyester of component a), is at least 0.1 wt.-%.

8. The liquid laundry detergent composition according to claim 1, wherein the repeating structural units of the at least one polyester of component a) is exclusively selected from the group consisting of repeating structural units (a1) and (a2).

9. The liquid laundry detergent composition according to claim 1, wherein the at least one polyester of component a) are present in an amount of from 0.2 wt.-% to 5 wt.-% based on the total weight of the liquid laundry detergent composition.

10. The liquid laundry detergent composition according claim 1, wherein the at least one surfactant of component b) is selected from the group consisting of anionic, nonionic, cationic and zwitterionic surfactants.

11. The liquid laundry detergent composition according to claim 10, wherein the at least one surfactant of component b) is selected from the group consisting of linear alkyl benzene sulfonates, alkyl ether sulfates, nonionic surfactants, amine oxides and betaines.

12. The liquid laundry detergent compositions according to claim 1, wherein the at least one surfactant of component b) is present in an amount of from 6 to 60 wt.-% based on the total weight of the liquid laundry detergent composition.

* * * * *